United States Patent [19]

Wheeler

[11] Patent Number: 4,526,385
[45] Date of Patent: Jul. 2, 1985

[54] SELF-LUBRICATING PACKING MEMBER

[75] Inventor: John H. Wheeler, Dallas, Tex.

[73] Assignee: Texacone Company, Mesquite, Tex.

[21] Appl. No.: 670,221

[22] Filed: Nov. 13, 1984

[51] Int. Cl.[3] .................... F16J 15/32; F16J 15/40
[52] U.S. Cl. .................................. 277/153; 277/205;
 277/215; 277/DIG. 6
[58] Field of Search ................. 277/3, 27, 75, 76, 152,
 277/153, 205, 215, 212 R, 212 F, DIG. 6

[56] References Cited

U.S. PATENT DOCUMENTS

| | | |
|---|---|---|
| 2,076,747 | 4/1937 | Salisbury . |
| 2,106,829 | 2/1938 | Christenson . |
| 2,249,141 | 7/1941 | Johnson . |
| 2,316,713 | 4/1943 | Proctor . |
| 2,330,104 | 9/1943 | Antonelli ............................ 277/153 |
| 2,370,913 | 3/1945 | Proctor . |
| 2,523,604 | 9/1950 | Vedovell . |
| 2,746,781 | 5/1956 | Jones . |
| 2,797,944 | 7/1957 | Riesing . |
| 2,804,324 | 8/1957 | Stallings ............................. 277/153 |
| 2,804,325 | 8/1957 | Riesing .............................. 277/153 |
| 2,818,283 | 12/1957 | Hutterer . |
| 2,932,535 | 4/1960 | Peickii et al. ................... 277/152 X |
| 2,934,368 | 4/1960 | Adamson ........................... 277/153 |
| 3,129,964 | 1/1964 | McNeil . |
| 3,495,843 | 2/1970 | Andersen et al. ............. 277/153 X |
| 3,627,335 | 12/1971 | Wheeler . |
| 3,861,691 | 1/1975 | Wheeler . |
| 3,885,802 | 5/1975 | Wheeler . |
| 4,089,137 | 5/1978 | Wheeler . |
| 4,123,990 | 11/1978 | Wheeler . |
| 4,145,057 | 3/1979 | Wheeler . |
| 4,179,856 | 12/1979 | Wheeler . |
| 4,198,789 | 4/1980 | Wheeler . |
| 4,216,846 | 8/1980 | Wheeler . |
| 4,258,927 | 3/1981 | Cather ................................ 277/152 |
| 4,265,458 | 5/1981 | Wheeler . |
| 4,411,439 | 10/1983 | Couvillion et al. ............. 277/152 X |

FOREIGN PATENT DOCUMENTS

| | | | |
|---|---|---|---|
| 194202 | 12/1957 | Austria ............................... 277/153 |
| 56-150667 | 11/1981 | Japan ................................. 277/152 |
| 57-129964 | 8/1982 | Japan ................................. 277/152 |
| 545556 | 6/1942 | United Kingdom ............... 277/152 |

Primary Examiner—Robert S. Ward
Attorney, Agent, or Firm—Michael A. O'Neil

[57] ABSTRACT

A packing member comprising an annular body having a circular groove extending axially thereinto through an end wall to form inner and outer sealing lips utilizes a resilient circular member embedded in the annular body to exert a radially directed force to a wall surface of the groove to actuate one of the sealing lips. The other sealing lip has a plurality of spaced apart circular holes extending axially there into through the first end wall of the body. In the preferred embodiment the resilient member is a hollow O-ring of elastomeric material carried in a recess formed in the inner wall surface of the groove to actuate the inner sealing lip. An annular layer of self-lubricating polymeric material is disposed over the inner wall surface to facilitate low-friction slidable contact with a separate movable member. The inner sealing lip may be left exposed to ensure proper sealing engagement with a separate movable member, or alternately, an interior annular rib is provided beneath the polymeric layer or film for such improved sealing.

15 Claims, 6 Drawing Figures

SELF-LUBRICATING PACKING MEMBER

BACKGROUND OF THE INVENTION

This invention relates to sealing devices; and more particularly, it relates to a packing member for forming a seal between the inner wall of an opening and the outer surface of a member extending therethrough.

The subject packing member has at least one self-lubricating sealing surface to provide less frictional force when in slidable contact with a separate movable member.

It has heretofore been common practice to form a seal between the wall of an opening and a shaft or other cylindrical member extending therethrough by positioning a packing member between the wall of the opening and outer surface of the member.

Typically, packing members are annular bodies integrally formed from an elastic material such as rubber or plastic. Packing members generally have a V-shaped or truncated V-shaped cross-section. Packing members may also have a plurality of holes formed therein which extend axially into the member from equally spaced points along a circle extending around an end wall of the member.

In addition to the above basic packing members, various other fluid-sealing devices in the prior art have an annular body, and further comprise a garter spring. Sealing devices of this type have located the garter spring in a continuous groove formed in one end of the annular body by mere insertion of the spring between the inner and outer wall surfaces of the groove and against the bottom of the groove.

SUMMARY OF THE INVENTION

In accordance with the present invention, a packing member suitable for forming a seal between the inside surface of a bore and a shaft extending therethrough includes an annular body having by a circular outer wall and a circular inner wall, with first and second end walls extending between the inner and outer walls. The annular body has a circular groove in the first end wall, defining inner and outer sealing lips. A resilient, circular member is embedded in the annular body, with the member applying a radially directed force to both of the sealing lips.

The circular groove in the annular body further defines inner and outer wall surfaces. The inner wall surface is displaced radially outward from the inner wall of the body, and the outer wall surface is displaced radially inward from the outer wall of the body. The wall surface of the groove associated with the inner sealing lip has a recess formed therein for receiving the resilient member. The recess is disposed substantially parallel to the bottom of the groove in the annular body intermediate the top of the wall surface and the bottom of the groove.

In the preferred embodiment, the circular resilient member is a hollow O-ring carried in a recess in the inner wall surface of the circular groove to actuate both the inner and outer sealing lips. The resilient member preferably contacts both the inner and outer wall surfaces of the circular groove, being capable of applying greater sealing force to the inner sealing lip and lesser sealing force to the outer sealing lip.

The inner wall surface of the packing member has a bonded thin layer of solid organic polymeric material adhered thereto extending over a major portion thereof. The polymeric material preferably consists of Teflon or Teflon-like material thermally bonded to the inner wall surface such as by a spaced-apart series of openings. A woven cloth impregnated with the polymeric material is adhered to the inner wall except for the sealing lip portion which remains exposed for sealing engagement with a surrounded shaft or other movable member. Alternately, a thin film of polymeric material such as polytetrafluoroethylene is adhered directly to the inner wall surface without the woven cloth, the film covering the entire inner surface.

DESCRIPTION OF THE DRAWINGS

A more complete understanding of the invention may be had by referring to the following Detailed Description when taken in conjunction with the Drawings, wherein.

DETAILED DESCRIPTION

Figure 1:
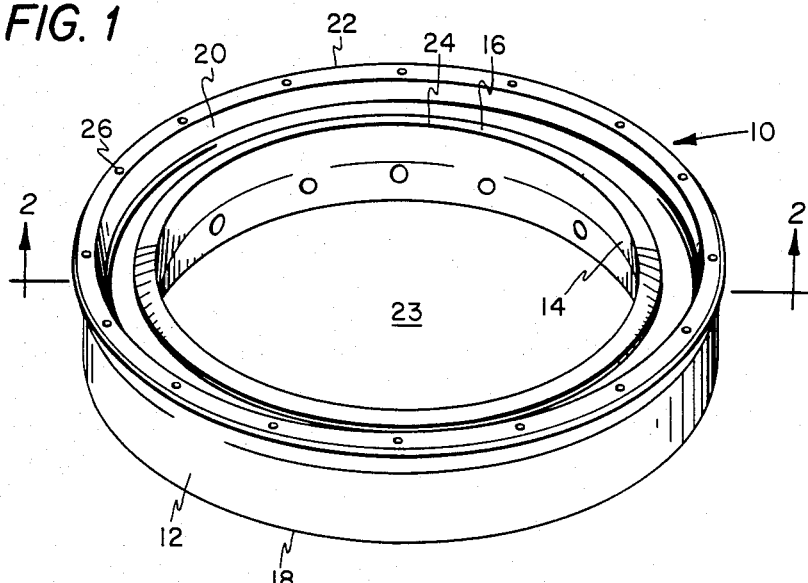
FIG. 1 is a perspective view of one embodiment of a packing member in accordance with the present invention.

Referring now to the drawings, and particularly to FIG. 1 thereof, a first embodiment of a packing member 10 in accordance with the present invention is shown therein. Packing member 10 comprises an annular body having a circular outer wall 12 and a circular inner wall 14 that defines circular opening 23. The annular body further includes first and second end walls 16 and 18, respectively, extending between the inner and outer walls 12 and 14.

As shown in FIG. 1, the first end wall 16 has a groove 20 formed therein defined an outer sealing lip 22 and an inner sealing lip 24. Packing member 10 is also provided with a plurality of openings 26, shown as circular holes, extending axially into the annular body of packing member 10 from equally spaced points along a circle extending around the top surface of outer sealing lip 22.

Figure 2:
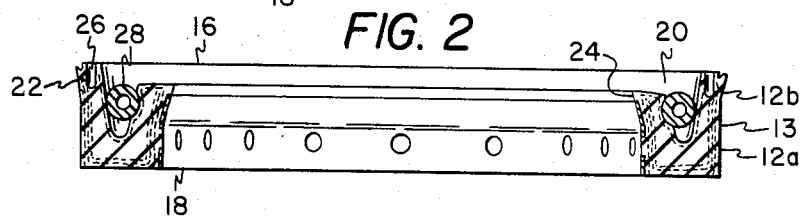
FIG. 2 is a vertical sectional view of the packing member shown in FIG. 1 taken along the line 2—2.

Referring now to FIG. 2, the sectional view of packing member 10 illustrates that outer wall 12 flares outwardly near end 16 to define a lower portion 12a and an upper portion 12b. The dividing line between the two portions where wall 12 begins to flare is shown by a transition line 13 extending around the annular body of member 10 between the first and second end surfaces 16 and 18. The portion 12a of wall 12 extends from end wall 18 toward wall 16 at an orientation that is substantially perpendicular to the flat surface of end wall 18. Wall portion 12b of outer wall 12, however, diverges outwardly from the transition line 13 to form the flared configuration for packing member 10.

Figure 3:
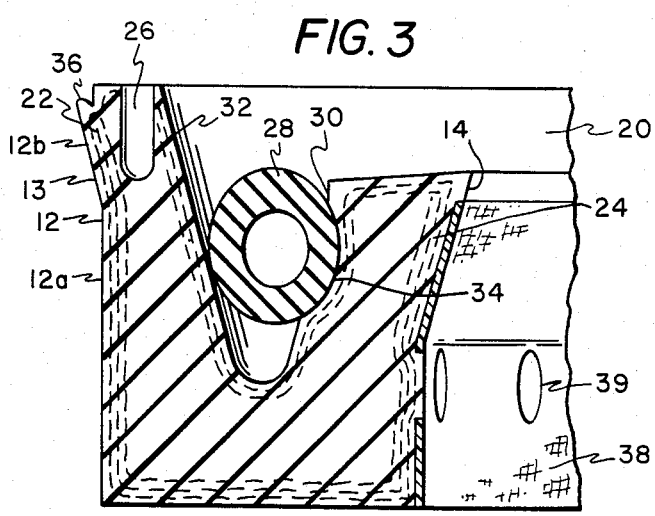
FIG. 3 is a further enlarged fragmentary vertical sectional view of the packing member shown in FIG. 2.

With reference now to FIG. 3, which is a further enlarged sectional view of the left side of FIG. 2, it may be seen that packing member 10 further includes a resilient, circular member 28 enbedded in the annular body. Also, it may be seen that groove 20 defines an inner wall surface 30 displaced radially outward from inner wall 14, which surface has a recess 34 formed therein for receiving resilient member 28. Groove 20 also defines an outer wall surface 32 displaced radially inward from outer wall 12.

The recess 34 in inner wall surface 30 is disposed at a location intermediate the top surface of inner sealing lip 24 and the bottom of groove 20, and extends around the annular body substantially parallel to the bottom of groove 20. Recess 34 is shaped in a semicircle to conform to the outside surface configuration of resilient member 28, which is shown as a circular hollow O-ring formed of elastomeric material.

Resilient member 28 applies both an inward, radially directed force to the inner wall surface 30 of groove 20, and an outward, radially directed force to the outer wall surface 32 of groove 20. The radially directed inward force urges inner wall 14 into sealing engagement with a shaft or other cylindrical member inserted within opening 23 that is to be sealed against the passage of fluid therearound. The radially directed outward force urges outer wall 12 into sealing engagement with a separate surrounding member.

It will be appreciated that resilient member 28 actuates the inner sealing lip 24 to form the sealing relationship with the member inserted through opening 23, whereas outer sealing lip 22 serves to form a seal around the outer wall of the annulus. It will further be observed that outer sealing lip 22 includes a small annular notch 36 at the outside peripheral edge thereof to permit fluid acting on end wall 16 to be utilized to actuate the outside sealing lip 22 into its sealing engagement with the annulus wall.

Resilient member 28 serves to apply greater sealing force to inner sealing lip 24 while also serving to apply lesser sealing force to outer sealing lip 22 due to its mounting within groove 20. The compression applied to the O-ring member contracts the same inwardly from both directions as the lips are compressed. The O-ring member is preferably formed of relatively soft elastomeric material having a hollow interior to facilitate greater compressability when mounted within the groove. The O-ring is bonded in place to ensure its permanent positioning within the groove and mounting recess.

An annular layer or recess film 38 of polymeric material such as polytetrafluoroethylene or polychlorotrifluoroethylene deposited on woven wide-mesh cotton or glass fiber cloth is mounted on the inner wall 14, preferably extending fully co-extensive with the lower portion leaving the upper portion of inner sealing lip 24 exposed. The woven layer or film of polymeric material has a thickness ranging from about 2 to 10 mils depending upon the intended service application. Layer or film 38 has a spaced apart series of openings 39 therein to facilitate its bonding to the annular body of the packing member. Thermal fusion or vulcanization may be employed to adhere the polymeric layer to the body which may consist of relatively hard elastomeric material. Upon heating such as to the vulcanization temperature the elastomeric body material may flow into the openings 39 and surround the upper edge of the polymeric material to achieve permanent durable bonding. If necessary, the polymeric material is ground off the back of the woven cloth to permit permanent adherence to the body member.

One form of the polymeric material comprises Teflon film and another form comprises Kel-F film, which are polymers of polytetrafluoroethylene and polychlorotrifluoroethylene, respectively.

Figure 4:
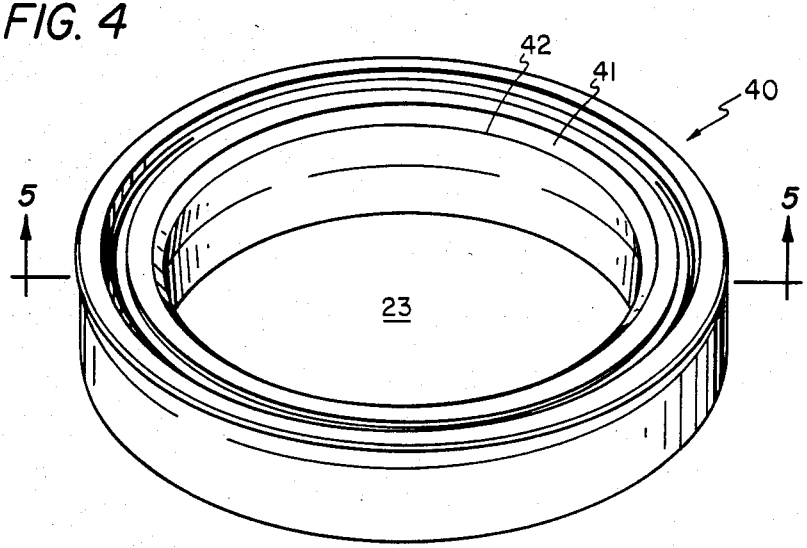
FIG. 4 is a perspective view of a second embodiment of the packing member.
Figure 5:
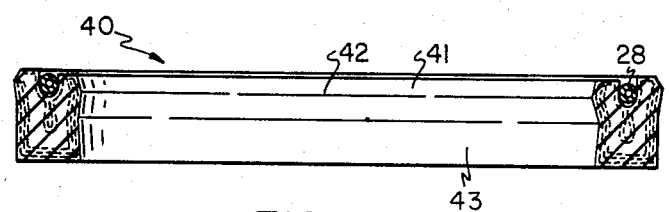
FIG. 5 is a vertical sectional view of the packing member shown in FIG. 4 taken along the line 5—5.
Figure 6:
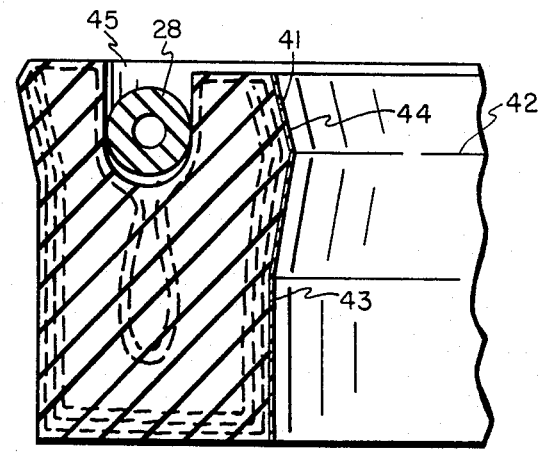
FIG. 6 is a further enlarged fragmentary vertical sectional view of the packing member shown in FIG. 5.

In another embodiment of the invention, packing member 40 is shown in FIG. 4 with its inner sealing lip 41 having an inwardly-projecting annular rib 42 formed on its inner surface 43 adjacent its upper edge. The packing member shown in FIGS. 4-6 has the same basic structure as that shown in FIGS. 1-3 except for its inner surface configuration and polymeric material layer. Rib 42 is formed in the area of divergent wall portion 12a of the first embodiment. The rib has a generally pointed triangular shape in cross-section terminating in an annular linelike bead for improved sealing. The inner surface 43 has a film-like covering of a polymeric film 44 over its interior surface, the film being essentially fully co-extensive therewith. In this embodiment the wide-mesh cloth beneath the film is not required, nor are the series of spaced-apart openings, the film being adhered directly to the inner surface of the body such as by thermal fusion. The film is preferably comprised of Teflon or Kel-F type polymeric material as aforesaid. Packing member 40 has an annular O-ring member 28 located in groove 45 as in the first embodiment.

The polymeric material serves to provide a selflubricating low-friction capability to the packing member. Such feature is of particular value where hydraulic elements of elevator systems are fabricated of lightweight alloy or plastic materials, for example, and the loading on the mounting shaft is insufficient for rapid lowering by gravity. The inner lining of organic material minimizes frictional forces between the packing member to assist in more rapid movement between slidable telescoping components.

From the foregoing, it will be understood that whereas prior art packing members have utilized garter springs and solid rings disposed in continuous grooves, the packing member of the present invention has a resilient O-ring member embedded in a wall surface of the groove, with the member applying a selectively greater force on the one wall surface of the groove to actuate both inner and outer sealing lips defined by the groove.

Although two preferred embodiments of the invention have been illustrated in the accompanying Drawings and described in the foregoing Detailed Description, it will be understood that the invention is not limited to the embodiments disclosed, but is capable of numerous modifications without departing from the spirit and scope of the invention.

I claim:

1. A self-lubricating packing member comprising: an annular body having a circular outer wall and a circular inner wall, with first and second end walls extending between the inner and outer walls;

said annular body having a groove with inner and outer groove walls extending axially into the body through the first end wall;

the inner and outer walls of said body including inner and outer sealing lips, respectively, formed therein adjacent to at least a portion of the groove;

a resilient, circular member comprising an elastomeric O-ring member engaging both of the groove walls for applying a radially directed force to both of the sealing lips;

said annular body including a plurality of spaced apart openings extending axially into the first end wall thereof between the other groove wall and the other sealing lip, and a layer of self-lubricating polymeric material adhered to the circular inner wall to provide lesser frictional force when in slidable contact with a separate movable part.

2. The packing member of claim 1 wherein the said layer of self-lubricating polymeric material comprises polytetrafluoroethylene.

3. The packing member of claim 1 wherein the said layer of self-lubricating polymeric material comprises polychlorotrifluoroethylene.

4. The packing member of claim 2 wherein the said layer of self-lubricating polymeric material is adhered to woven cloth and extends essentially coextensive with the lower portion of the said circular inner wall with the inner sealing lip exposed.

5. The packing member of claim 1 wherein the said layer of self-lubricating polymeric material includes a plurality of spaced apart openings therein to facilitate attachment of said layer to said circular inner wall.

6. The packing member of claim 1 wherein the wall of the groove engaged by said resilient member has a recess formed therein for receiving the said resilient member.

7. The packing member of claim 6 wherein the recess is disposed in the inner groove wall substantially adjacent to the inner sealing lip.

8. The packing member of claim 1 wherein the said resilient circular member is comprised of a hollow O-ring of elastomeric material adhered to the inner walls of said groove.

9. The packing member of claim 1 wherein the said circular inner wall has a generally pointed inwardly projecting annular rib adjacent the first end wall for improved sealing of the inner sealing lip.

10. A self-lubricating packing member comprising:
an annular body having a circular outer wall and a circular inner wall, with first and second end walls extending between the inner and outer walls;
said annular body having a circular groove extending axially into the body through the first end wall to provide inner and outer sealing lips for the inner and outer walls of the body, the groove defining inner and outer groove wall surfaces displaced radially outward from the inner wall of the annular body with one of the groove wall surfaces having a recess formed therein;
a resilient, circular member comprising an elastomeric O-ring member carried in the recess formed in said one groove wall surface for applying radially directed force to actuate the sealing lips associated with the said groove wall surfaces;
said annular body including a plurality of spaced apart openings extending axially into the first end wall between the other groove wall surface and the other sealing lip associated with the said other groove wall surface, and
an annular layer of self-lubricating solid polymeric material adhered to the said circular inner wall in bonded relation to provide lesser frictional force when in slidable telescoping contact with a separate movable member.

11. The packing member of claim 10 wherein the said annular layer of self-lubricating polymeric material comprises polytetrafluoroethylene.

12. The packing member of claim 10 wherein the recess is formed in the inner groove wall surface, and wherein the resilient, circular member is a hollow O-ring of elastomeric material having a circular cross-section.

13. The packing member of claim 10 wherein the said annular layer of self-lubricating polymeric material is essentially fully co-extensive with the said circular inner wall and includes a plurality of spaced apart openings therein to facilitate attachment of said layer to said inner wall by thermal fusion.

14. The packing member of claim 10 wherein the recess formed in the one groove wall surface is disposed in substantially parallel relation with the bottom of the groove in the annular body.

15. The packing member of claim 10 wherein the said circular inner wall has a generally pointed inwardly-projecting annular rib adjacent the first end wall, said annular layer of solid polymeric material extending substantially fully co-extensively with said circular inner wall and adhered thereto.

* * * * *